United States Patent
Wang

(10) Patent No.: US 7,844,220 B2
(45) Date of Patent: Nov. 30, 2010

(54) HEADSET, PORTABLE COMMUNICATION SYSTEM, AND HEADSET CALLING METHOD

(75) Inventor: Weizhong Wang, Tokyo (JP)

(73) Assignee: NEC Corporation (JP)

( * ) Notice: Subject to any disclaimer, the term of this patent is extended or adjusted under 35 U.S.C. 154(b) by 699 days.

(21) Appl. No.: 11/297,570

(22) Filed: Dec. 8, 2005

(65) Prior Publication Data

US 2006/0121960 A1    Jun. 8, 2006

(30) Foreign Application Priority Data

Dec. 8, 2004    (JP)    ............ 2004-355794

(51) Int. Cl.
*H04B 1/00*    (2006.01)
*H04M 1/00*    (2006.01)

(52) U.S. Cl. ............ 455/39; 455/41.2; 455/552.1; 455/575.2

(58) Field of Classification Search ....... 455/41.2–41.3, 455/575.2, 552.1; 379/428.02, 430
See application file for complete search history.

(56) References Cited

U.S. PATENT DOCUMENTS

| | | | | |
|---|---|---|---|---|
| 5,913,163 | A * | 6/1999 | Johansson | 455/426.1 |
| 6,223,029 | B1 * | 4/2001 | Stenman et al. | 455/420 |
| 6,253,088 | B1 | 6/2001 | Wenk et al. | 455/462 |
| 7,107,010 | B2 * | 9/2006 | Heinonen et al. | 455/41.2 |
| 7,233,808 | B2 * | 6/2007 | Mooney et al. | 455/557 |
| 7,242,765 | B2 * | 7/2007 | Hairston | 379/419 |
| 7,292,880 | B2 * | 11/2007 | Lehtonen | 455/569.1 |
| 7,305,258 | B2 * | 12/2007 | Rydgren et al. | 455/573 |
| 2002/0013784 | A1 * | 1/2002 | Swanson | 707/104.1 |
| 2002/0016188 | A1 | 2/2002 | Kashiwamura | |
| 2004/0229658 | A1 | 11/2004 | Kim et al. | |
| 2007/0207801 | A1 | 9/2007 | Careel et al. | |

FOREIGN PATENT DOCUMENTS

| | | |
|---|---|---|
| EP | 0 696 153 A1 | 2/1996 |
| JP | 05-244078 | 9/1993 |
| JP | 06-141308 | 5/1994 |
| JP | 07-025646 | 1/1995 |
| JP | 07-074804 | 3/1995 |
| JP | 7-143553 | 6/1995 |
| JP | 2003-061146 | 2/2003 |
| JP | 2003-134224 | 5/2003 |
| JP | 2003-283693 | 10/2003 |

(Continued)

OTHER PUBLICATIONS

Search Report issued by European Patent Office on Mar. 30, 2006 in connection with corresponding European patent application No. 05 026 754.1

(Continued)

*Primary Examiner*—Simon D Nguyen
(74) *Attorney, Agent, or Firm*—Ostrolenk Faber LLP

(57) ABSTRACT

Disclosed is a headset which includes a radio communication unit and control unit. The radio communication unit has 2 communication mode. The first mode is used for communication with an access point connected to a fixed network. The second mode is used for communication with a specific portable communication terminal. The communication control unit judges whether the headset can communicate with the access point. The communication control unit selects either one of said first and said second mode based on the judgment result. When the first mode is selected, the communication control unit connects the headset to the fixed network with the telephone number of the specific portable communication terminal as a telephone number of the call originating party.

10 Claims, 14 Drawing Sheets

FOREIGN PATENT DOCUMENTS

| | | |
|---|---|---|
| JP | 2004-297490 | 10/2004 |
| JP | 2004-343675 | 12/2004 |
| JP | 2005-323265 | 11/2005 |
| JP | 2006-523401 | 10/2006 |
| WO | WO 97/34403 | 9/1997 |
| WO | WO 2004/019566 | 3/2004 |

OTHER PUBLICATIONS

Office Action issued by the Chinese Patent Office on Sep. 4, 2009 in connection with corresponding Chinese Patent Application No. 200510134547.1.

Translation of Office Action issued by the Chinese Patent Office on Sep. 4, 2009 in connection with corresponding Chinese Patent Application No. 200510134547.1.

Office Action issued by the Japanese Patent Office on Aug. 24, 2010 in connection with corresponding Japanese Patent Application No. 2004-355794.

Partial translation of Japanese Office Action issued in connection with Japanese Patent Application No. 2004-355794 on Aug. 24, 2010.

* cited by examiner

HEADSET, PORTABLE COMMUNICATION SYSTEM, AND HEADSET CALLING METHOD

BACKGROUND OF THE INVENTION

1. Field of the Invention

The present invention relates to a portable communication system using a headset for calling to which a headphone and a microphone are attached, and a headset calling method. Particularly, the present invention relates to a headset, a portable communication system using the headset, and a headset calling method suitable for hands-free calling using a portable communication terminal.

2. Description of the Related Art

When making a call using a portable communication terminal, for example, a portable phone, a PHS (Personal Handy-phone System), etc., normally a caller holds a terminal in hand near his/her head. In order to eliminate this inconvenience, recently, a headset and a portable terminal are used in combination in some cases. That is, a caller is able to make a hands-free call by attaching a headset to his/her head and connecting the headset and a portable communication terminal with a cable.

Recently, a technique called Bluetooth has made its debut. By using the Bluetooth technique, it is possible for a relatively small type information processing device or portable communication terminal to transmit/receive speech and data at a high transmission rate of 1 Mbps by radio waves. The Bluetooth has, in comparison to infrared communication, advantages that power consumption is small and that communication is not blocked by obstacles when the distance between devices is about 10 m or less.

Recently, development of a chipset designed specially for the Bluetooth is positively being promoted. Accompanying this, various portable communication terminals using the Bluetooth have appeared. Due to this, it has become possible to perform radio communication with a headset having a built-in chipset for the Bluetooth. As a consequence, it becomes no longer necessary to connect a cable between a portable communication terminal and a device, therefore, a user is not restricted by the length of the cable in respect to the sphere of activity when using a portable communication terminal. Such advantages of the Bluetooth technique have been recognized and researches on communication devices using the Bluetooth technique have become more and more positive.

FIG. 14 shows a case where a portable communication terminal operates as an audio gateway as an example. A portable communication terminal 101 and a headset 103 incorporate therein chipsets 102 and 103 for the Bluetooth, respectively. The portable communication terminal 101 is connected to a mobile network 105 such as W-CDMA and GSM and able to receive necessary music data from a music distribution server in addition to performing telephone communication. By connecting the headset 103 and the portable communication terminal 101 with a Bluetooth communication channel 106, it is possible for a user to listen to the music data stored in the portable communication terminal 101 through the headset 103 by directing replay or stop of the music from the headset 103.

In addition thereto, by connecting the portable communication terminal 101 to an audio device of a vehicle including a speaker, it is possible to realize a hands-free voice response. Furthermore, applications of the Bluetooth are researched in order to realize file transfer between the portable communication terminal 101 and a personal computer or a communication device such as a PDA (Personal Digital Assistant) and synchronization of operations between these devices.

Thereupon, in the prior art, the portable communication terminal 101 is constituted so as to be connected only to the mobile network 105. As represented by the W-CDMA (Wideband Code Division Multiple Access) system and the GSM (Global System for Mobile) system, a portable communication terminal performs communication by using only a mobile communication network.

In contrast, a portable communication terminal capable of selecting not only the mobile network 105 but also a fixed network has been proposed. For example, Japanese Patent Application Laid-Open No. HEI 07-143553 (Document 1) has proposed such a portable communication terminal. The portable communication terminal described in the Document 1 comprises a radio channel control circuit for performing communication with a radio base station in a mobile network, a cable control circuit for performing communication with a terminal station in a fixed network, a channel switching circuit for selecting one of the two control circuits, and a charged capacity monitor unit for monitoring the charged capacity of its battery. The portable communication terminal is connected to the fixed network with a cable. When the charged capacity of the portable communication terminal drops and radio communication becomes difficult to continue, the channel switching circuit switches the channels from a radio side to a cable side, thereby it is possible for the portable communication terminal to continue communication through cable communication.

By partially utilizing a fixed network, it is possible to reduce communication costs. For example, let's consider a case of connecting a portable communication terminal to a fixed network via an access point provided in the interior by using the portable communication terminal mounted with a chipset for the Bluetooth. In this case, it becomes possible to reduce communication costs compared to the case where a call is made using only a rather expensive mobile network. Further, it is also effective for reduction in communication costs to connect a portable communication terminal to a fixed network through a wireless LAN (Local Area Network).

As described above, by also using with a fixed communication network, a subscriber of a portable communication terminal can receive a merit that it is possible to receive services of high quality while reducing communication costs. On the mobile communication operation company side, income from communication costs decreases by those corresponding to the costs by a fixed network. However, it is possible for the mobile communication operation company to obtain a larger number of subscribers by providing the merit of low-cost service.

By the way, there may be a case where a portable communication terminal is out of the area of radio communication, of course there may also be a case where the portable communication terminal is near a user, when the user of the portable communication terminal moves about in a office etc. with a headset attached on the request for hand-free calling. According to the conventional proposal described in Document 1, the relationship between a fixed network and a mobile network is considered only for a portable communication terminal, and no consideration with a headset included is made. Because of this, in an attempt to utilize a fixed network in a portable communication system with a headset included, there may occur a case where switching between a mobile network and a fixed network does not function properly.

SUMMARY OF THE INVENTION

First exemplary feature of the present invention provides a headset capable of a switching control between a fixed network and a mobile network, while taking into consideration a spatial arrangement of the headset, a portable communication terminal, and the fixed network.

According to first exemplary aspect of the invention, there is provided a headset which includes a radio communication unit and control unit. The radio communication unit has 2 communication modes.

The first communication mode is used for communication with an access point connected to a fixed network. The second communication mode is used for communication with a specific portable communication terminal.

The communication control unit judges whether the headset can communicate with the access point. The communication control unit selects either one of the first and second communication mode based on the judgment result. If the first communication mode is selected, the communication control unit connects the headset to the fixed network with the telephone number of the specific portable communication terminal as a telephone number of the call originating party.

That is, the headset according to the first exemplary aspect of the invention performs communication with a fixed network in a first communication mode when it is possible to connect to the fixed network via an access point. Otherwise, the headset performs communication with the fixed network via a specific portable communication terminal and mobile network using a second communication mode.

The headset according to the first exemplary aspect of the invention is capable of performing radio communication with an access point at which a headset is connected to the fixed network. Accordingly, if the headset exists in an area where communication is possible with the access point, it is possible to make a call via the fixed network using the telephone number of the specific portable communication terminal and to ensure economic communication using the fixed network and high quality communication.

Other features and aspects of the invention will be made clear by the description in preferred embodiments.

DETAILED DESCRIPTION OF THE PREFERRED EMBODIMENTS

Preferred embodiments of the present invention will be explained below with reference to drawings.

Figure 1:
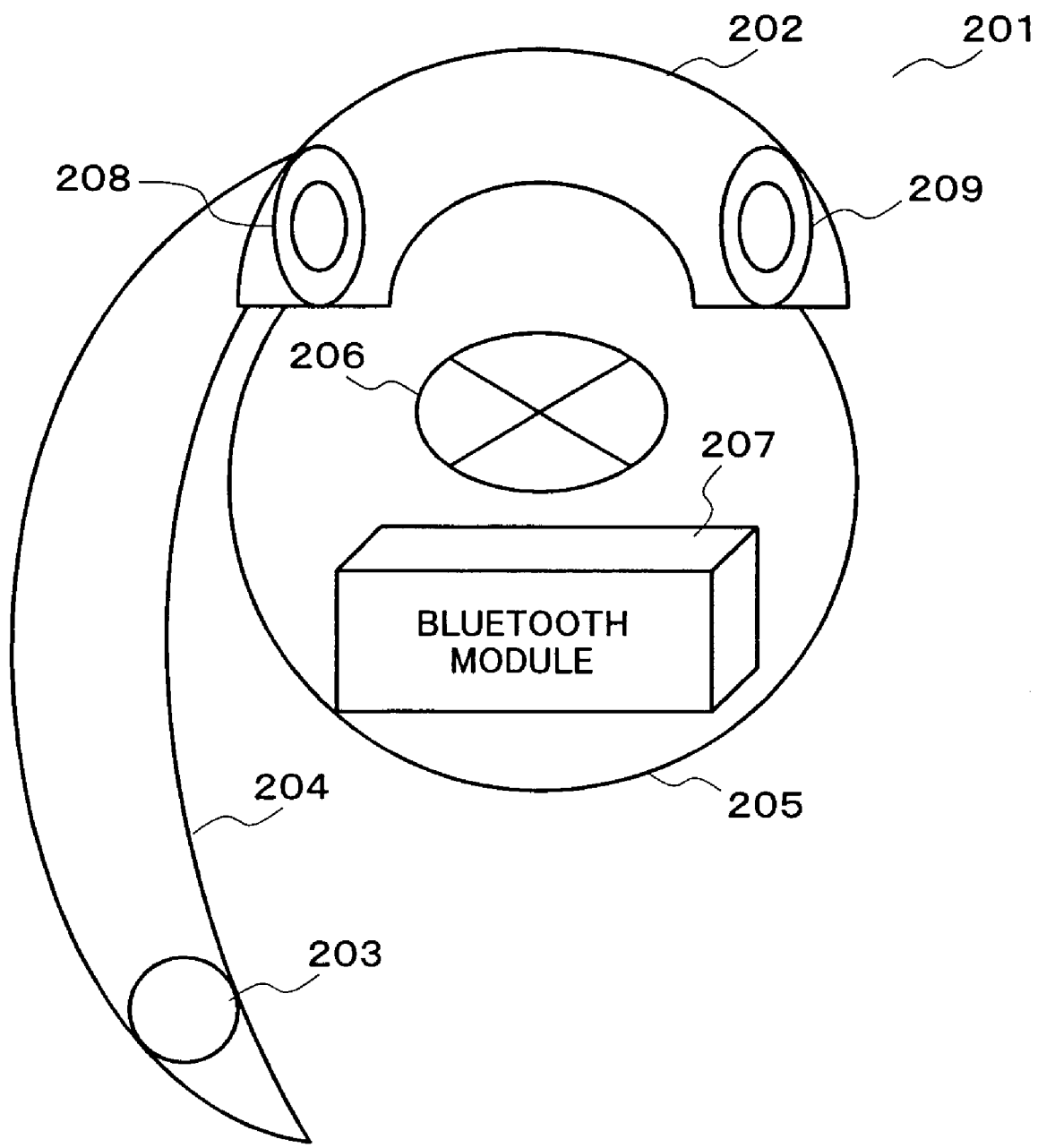
FIG. 1 is a front view showing the outline of a headset in an embodiment of the present invention.

FIG. 1 shows the outline of a headset used in a portable communication system in an embodiment of the present invention. A headset 201 comprises a bow-shaped part 202. To one end of the bow-shaped part 202, a microphone attaching arm 204 is attached, one end of which is held rotatably about an axis, not shown, and to the other end of which, a microphone 203 is attached. The upper end of the bow-shaped part 202 and the upper end of a disc-shaped headset main body 205 covering the auricles are attached so as to be able to open and close freely by a hinge mechanism, not shown. The bow-shaped part 202 and the headset main body 205 are closed toward each other so as to sandwich the auricles by a spring, not shown, thereby it is fixed to the head.

A speaker 206 is arranged almost at the center of the headset main body 205. Further, inside the headset main body 205, a Bluetooth module 207, and a power source and other circuits, not shown, are arranged. The Bluetooth module 207 is equipped with a communication circuit necessary for performing communication with the Bluetooth.

Further, in the vicinity of the end of the bow-shaped part 202 side at which the microphone attaching arm 204 of the bow-shaped part 202 is attached, a call/call end button 208 to direct the start and end of a call is attached. Furthermore, in the vicinity of the end on the opposite side to the bow-shaped part 202 side at which the call/call end button 208 of the bow-shaped part 202 is attached, a call origination dial button 209 is attached.

Figure 2:
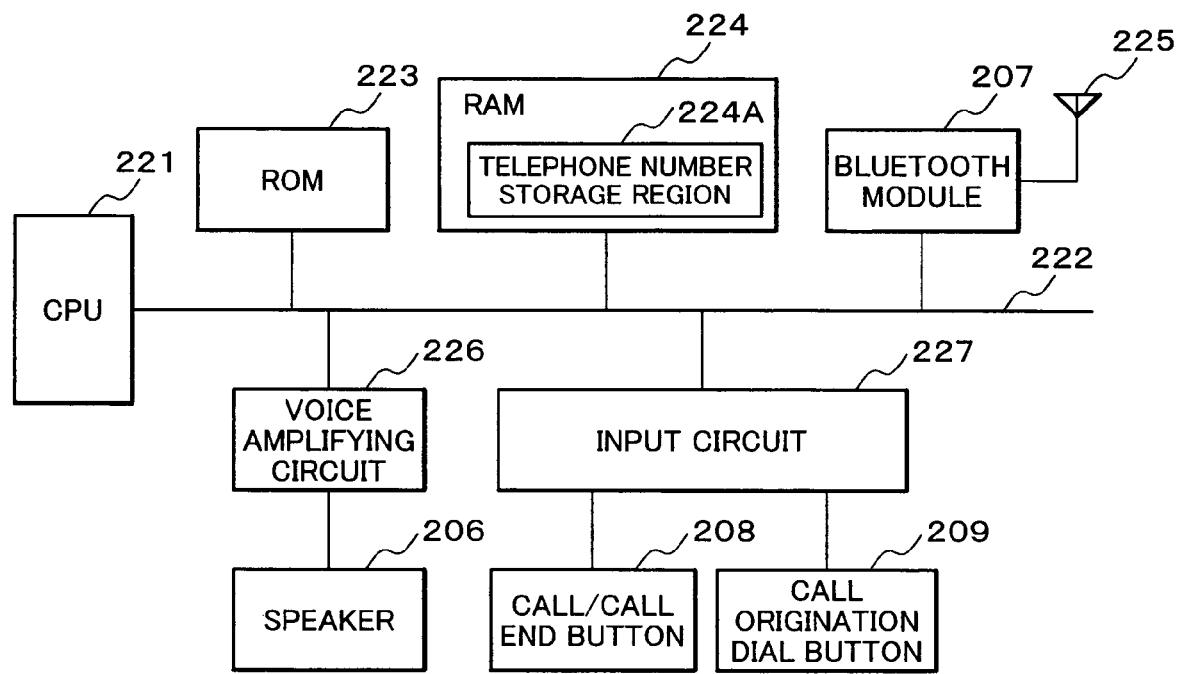
FIG. 2 is a block diagram showing the outline of the circuit part of the headset in the present embodiment.

FIG. 2 shows the outline of a circuit part of the headset. The headset 201 comprises a CPU (Central Processing Unit) 221. The CPU 221 is connected to each part inside the device via a bus 222 such as data bus. A read only memory (ROM) 223 stores a control program controlling each part of the headset 201. A random access memory (RAM) 224 serves a role as a working memory for temporarily storing data used on the occasion of various controls. The RAM 224 is provided with a telephone number storage region 224A for storing the telephone number of the other party to which a call has been made previously, and this memory area is constituted of a nonvolatile memory. To the Bluetooth module 207, an antenna 225 is attached. A voice amplifying circuit 226 is a circuit for amplifying voice data as well as converting it into a voice. To the output side of the voice amplifying circuit 226, the speaker 206 is connected. The call/call end button 8 and the call origination dial button 209 are connected to an input circuit 227 and the result of the input operations is sent out to the bus 222.

The headset 201 according to the present embodiment has a transmission power of about 1 mW and a communication distance of about 10 m. However, by increasing the transmission power of the Bluetooth module 207 to, for example, 100 mW, it is possible to increase the transmission distance until about 100 m.

Figure 3:
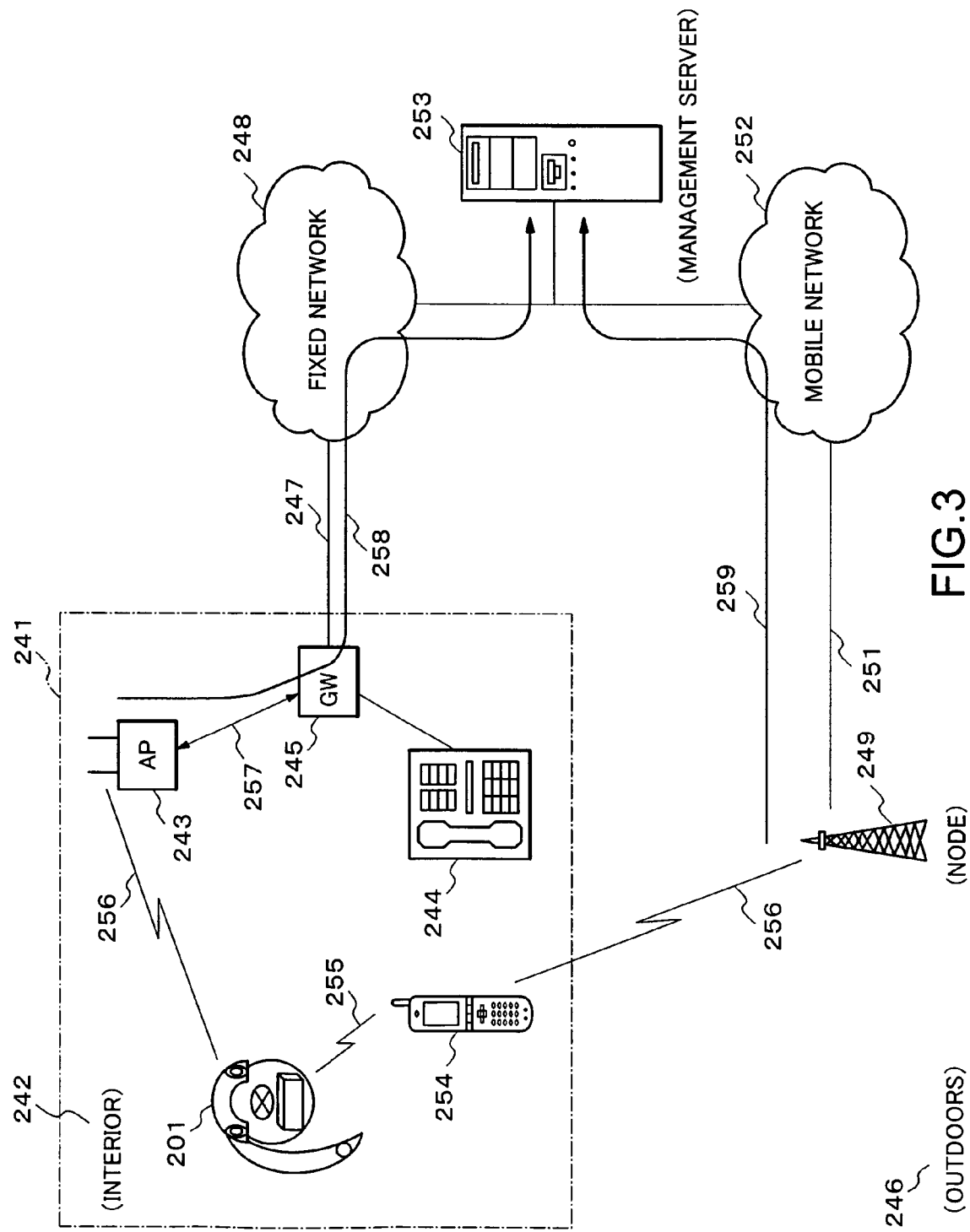
FIG. 3 is a diagram showing a communication channel when a user is in the interior in a portable communication system using the headset in the present embodiment.

FIG. 3 shows a case where a user is in the interior in a portable communication system in the present embodiment. The internal area surrounded by a chain line 241 shows the interior 242. The interior 242 is fitted with an access point (AP) 243 for radio communication and an access gateway (GW) 245 for connecting the AP 243 and a fixed telephone 244. In the outdoors 246, there exist a fixed network 248 connected to the access gateway 245 via a telephone line 247, a node 249 as a radio base station, and a mobile network 252 connected to the node 249 via a communication cable 251. To both of the fixed network 248 and the mobile network 252, a management server 253 managing the entire system is connected. The mobile network 252 may be a 2G (The 2nd Generation) system such as GSM or a 3G system such as W-CDMA.

In this example in FIG. 3, a user (not shown) is in the interior 242 and puts a portable phone 254 as a portable communication terminal on a desk (not shown). The user attaches the headset 201 shown in FIG. 1 to his/her head. In this state, the portable phone 254 is in radio communication with the node 249. Further, the headset 201 is in communication with the portable phone 254 and the access point 243 through the Bluetooth 255 and 256. The access point 243 is in communication with the access gateway 245 via a predetermined communication channel 257.

In such a portable communication system, the telephone number of the fixed telephone 244 differs from the telephone number of the portable phone 254. As shown in FIG. 3, although the portable phone 254 is in the interior, it is possible for the headset 201 to establish communication via the fixed network 248 as shown by a channel 258. The telephone number of the headset 201 may be the same as that of the portable phone 254. In addition, of course it is possible for the user to make a call using the portable phone 254 without using the headset 201.

In the present embodiment, the headset 201 performs transmission of the identification number, which is different from the telephone numbers of the phones 244 and 245, periodically. When the user moves into the interior 242 and the access point 243 detects this identification number, the access point 243 notifies the management server 253 via the channel 258 and the fixed network 248 in FIG. 3 that the headset 201 is connected. Due to this, the management server 253 can receive headset position information including "information as to whether the headset 201 is connected to the access point 243". In contrast, portable phone position information (position information of the portable phone 254 itself) is notified to the management server 253 via a channel 259 and the mobile network 252 illustrated.

Figure 4:
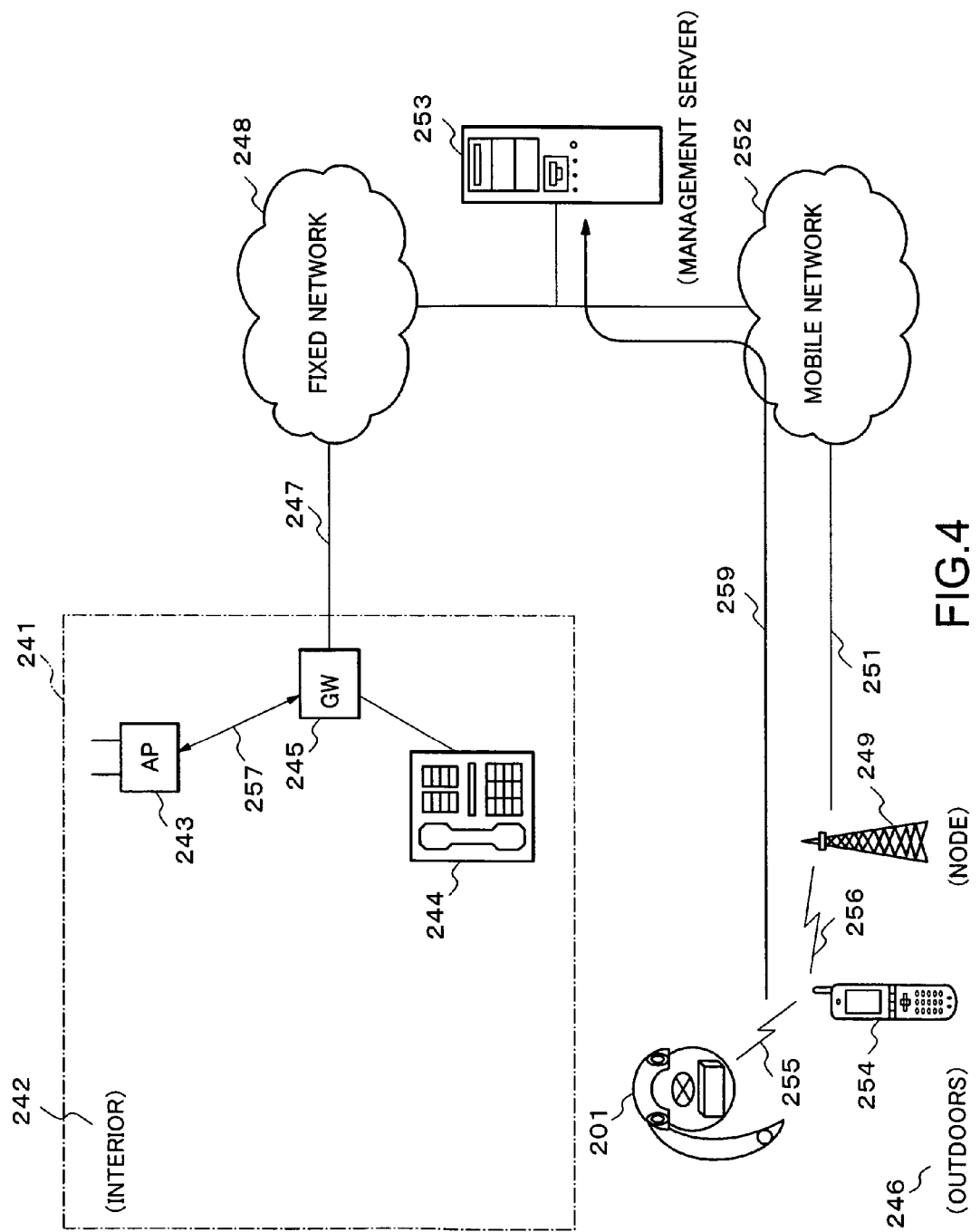
FIG. 4 is a diagram showing the communication channel in the portable communication system when the user is in the outdoors in the present embodiment.

FIG. 4 shows the communication channel of the portable communication system when the user is in the outdoors, differing from FIG. 3. If the user goes out in the outdoors 246 with the headset 201 attached to his/her head, the access point 243 cannot receive the identification number output from the headset 201. Accordingly, the management server 253 can receive the portable phone position information of the portable phone 254 via the mobile network through the channel 259 but cannot receive the headset position information of the headset 201. Due to this, it is possible for the management server 253 to grasp that the user can use only portable phone 254 to make a call in the state shown in FIG. 4.

Figure 5:
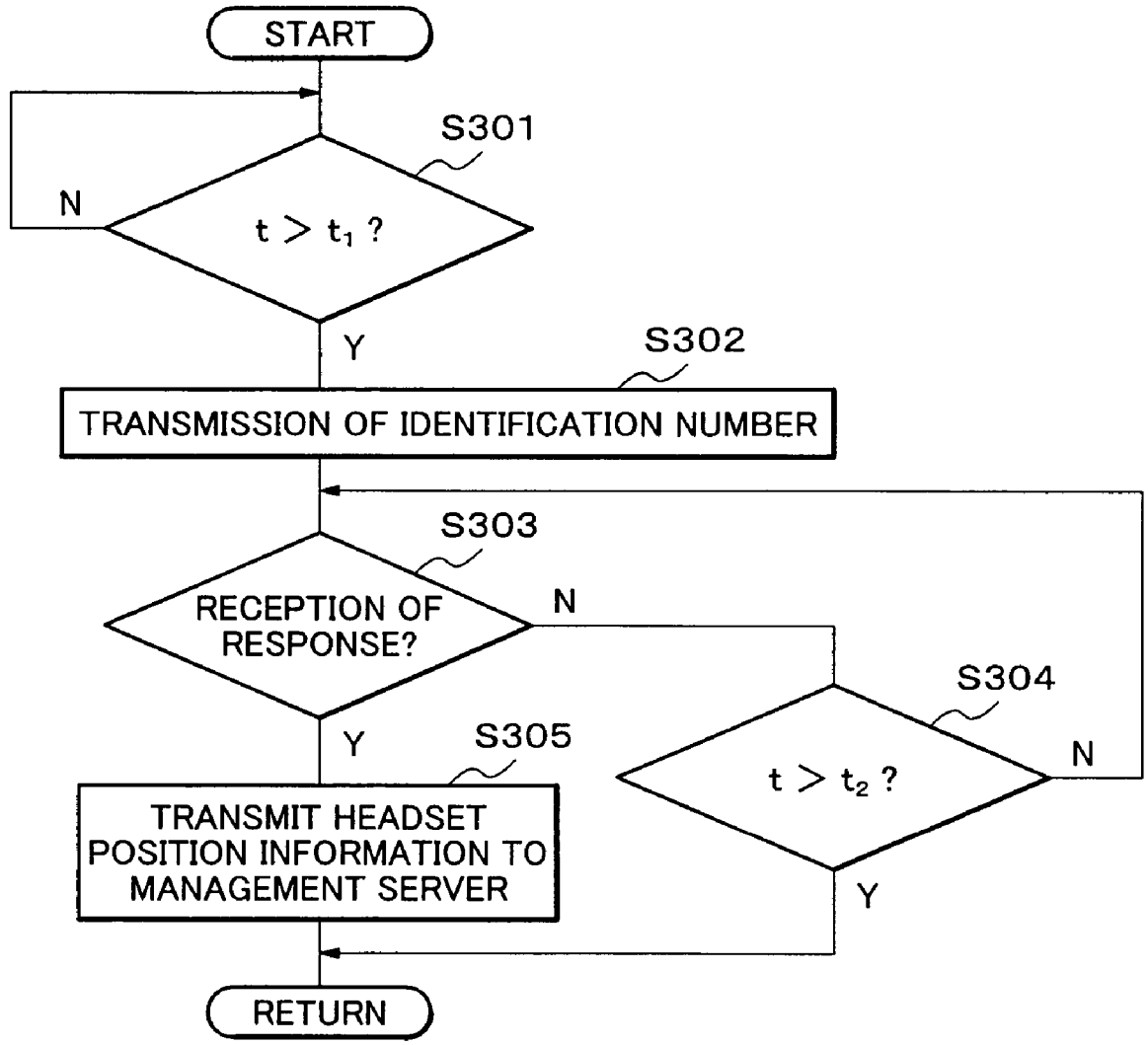
FIG. 5 is a flow chart showing transmission processing of a headset identification number and headset position information by the headset in the present embodiment.

FIG. 5 shows the flow of transmission processing of the headset position information by the headset. The headset 201 transmits the identification number at time intervals t1. When the time t1 elapses after the previous transmission of the identification number (step S301: Y), the headset 201 transmits its own identification number (step S302) and waits for the response to this from the access point 243 (step S303). If no response is received from the access point even a time t2 elapses after the transmission of the identification number (step S303: N, S304: Y), the operation of the headset returns to step S301 (RETURN) and the headset repeats the identification number transmission processing at the t1 intervals.

If the response from the access point is received before the time t2 elapses (step S304: N, step S303: Y), the headset 201 transmits the headset position information to the management server 253 via the access point 243 and the fixed network 248 (step S305). That is, when the headset 201 exists in the interior 242 where the access point 243 is installed, the management server 253 recognizes the fact by the reception of the headset position information.

When the headset 201 is in the outdoors 246, the management server 253 cannot receive the headset position information. Due to the fact that the management server cannot receive the headset position information, it is possible to recognize that the headset does not exist in an area in which communication with the access point 243 is possible.

Figure 6:
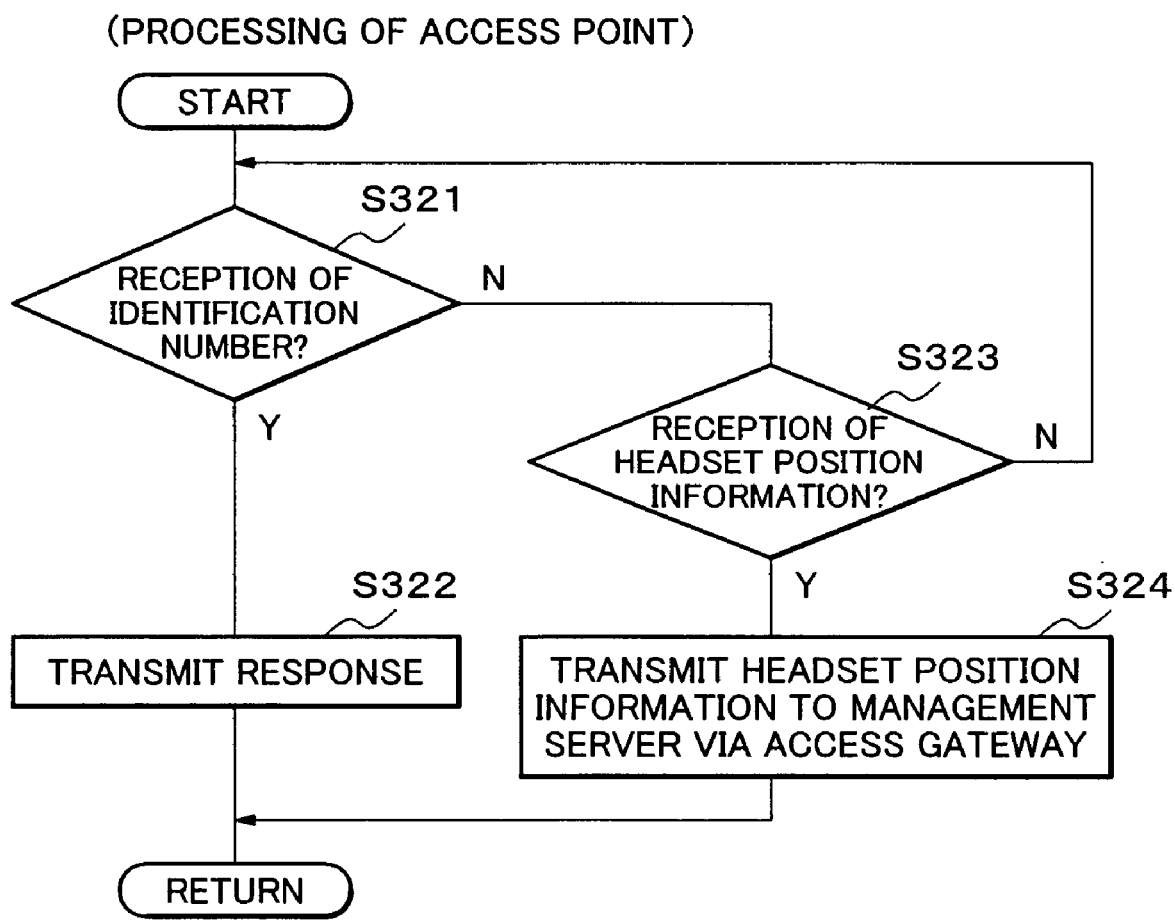
FIG. 6 is a flow chart showing reception processing of a headset identification number and headset position information by an access point in the present embodiment.

FIG. 6 shows processing of the access point when receiving an identification number and headset position information. When receiving an identification number (step S321: Y), the access point 243 transmits a response against the reception of the identification number to the headset 201 (step S322). When receiving headset position information (step S323: Y), the access point transmits the headset position information to the management server 253 via the access gateway 243 (step S324).

Figure 7:
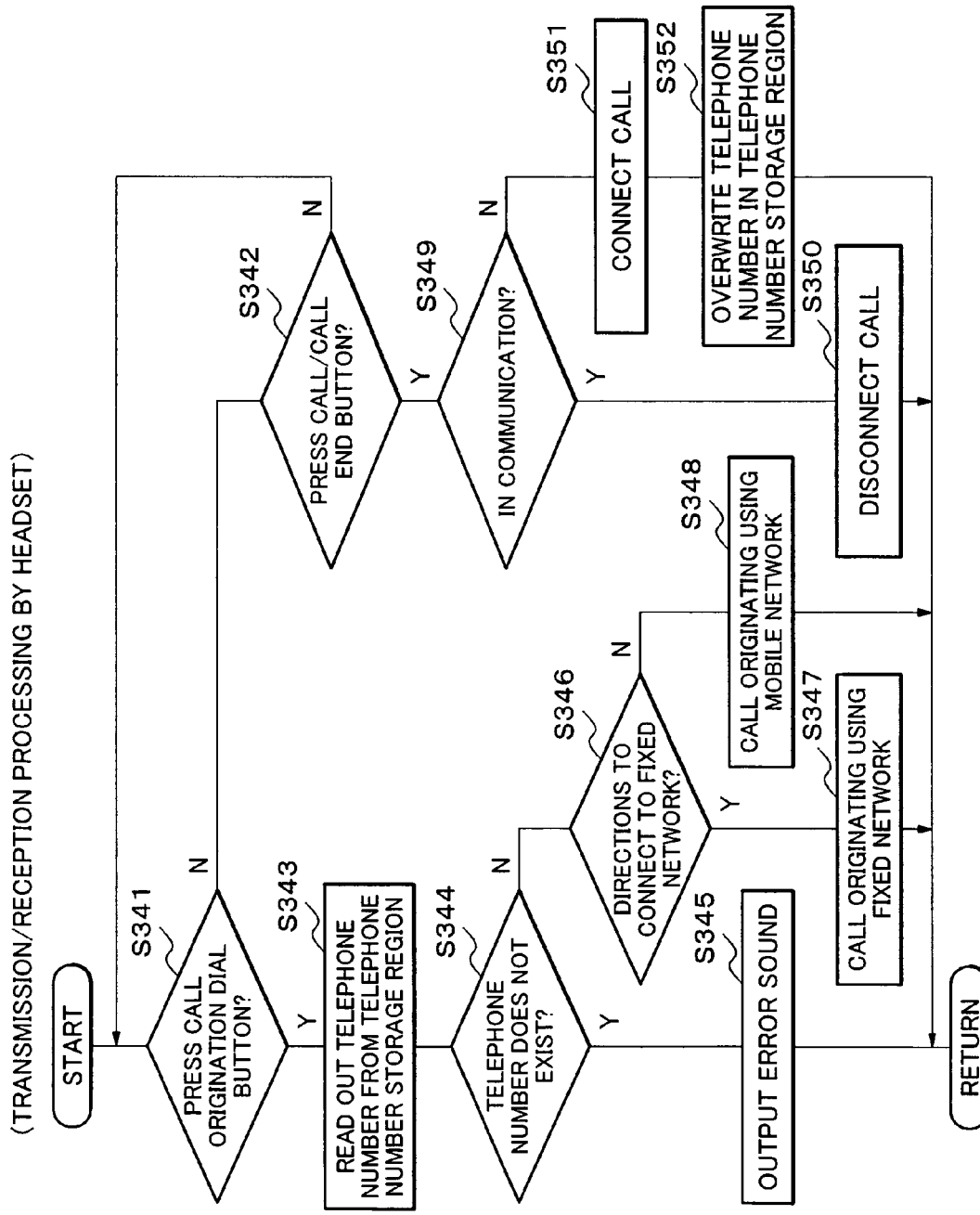
FIG. 7 is a flow chart showing call origination and reception processing by the headset in the present embodiment.

FIG. 7 is a flow chart showing call origination/reception processing by the headset.

In this processing, the headset 201 waits for either the call origination dial button 209 or the call/call end button 208 shown in FIG. 1 to be pressed (step S341, S342). When the call origination dial button 209 is pressed (step S341: Y), the headset reads the destination telephone number from the telephone number storage region 224A shown in FIG. 2 (step S343) If the telephone number is not stored in the telephone number storage region 224A (step S344: Y), the headset outputs an error sound from the speaker 206 (step S345) and ends the processing (END). Instead of an error sound, a voice message "the telephone number is not registered" may be output. In this case, the user is forced to perform the normal call originating operation using the portable phone 254. However, the case where no telephone number is stored in the telephone number storage region 224A occurs when the headset 201 is used for the first time or the contents of the RAM 224 are cleared by pressing the reset button, not shown, therefore, the operation to press the call origination dial button 209 in such a situation is generally not supposed to occur.

When a telephone number is stored in the telephone number storage region 224A in step S344 (N), the CPU 221 in FIG. 2 checks whether directions for fixed network communication is issued from the management server 253 (step S346). Then, when directions to use fixed network communication is issued (Y), the headset performs call origination to the other party via the access point 243, the access gateway 245, and the fixed network 248 (step S347). In this way, it becomes possible to realize economic communication utilizing the fixed network 248.

Figure 8:
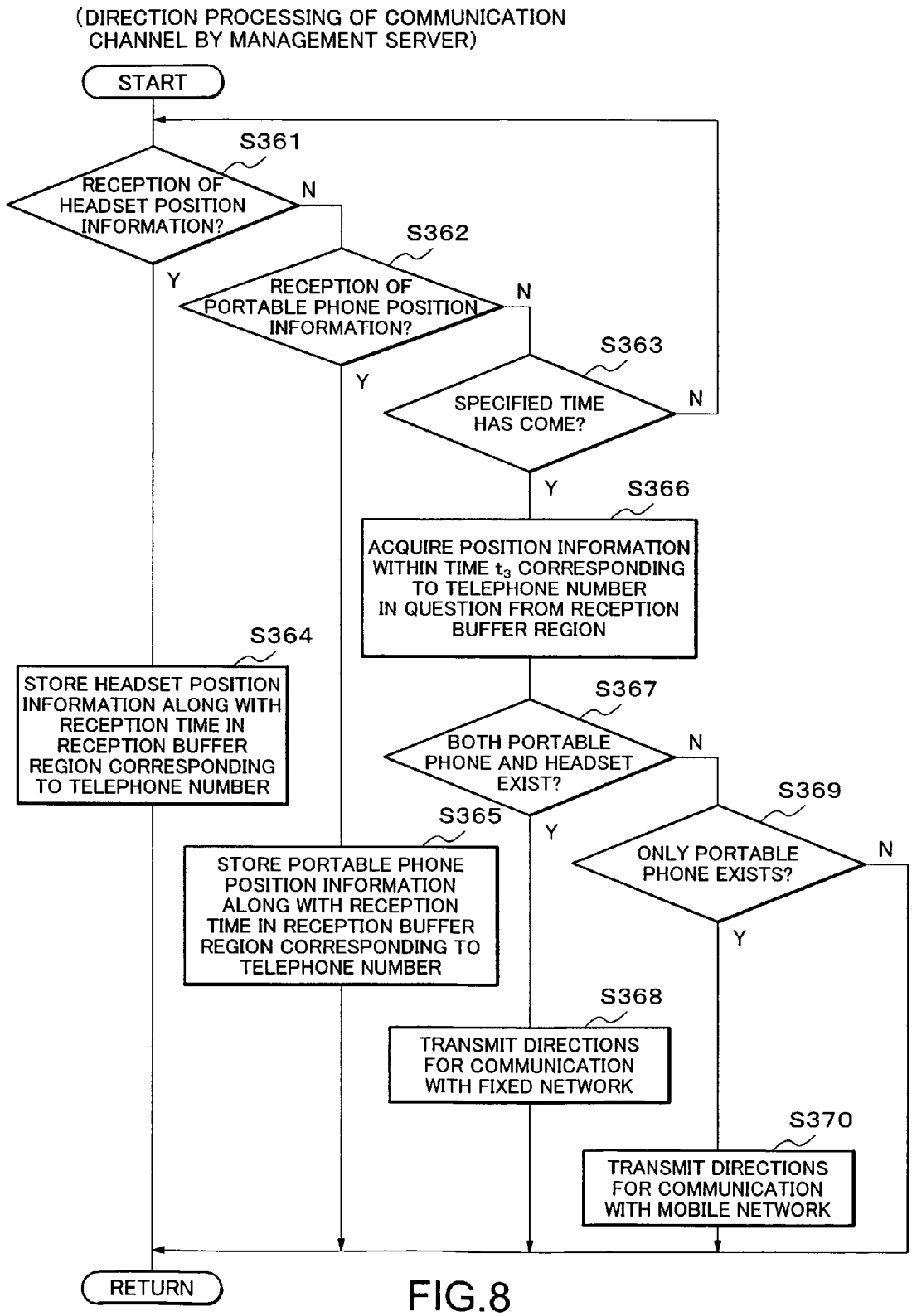
FIG. 8 is a flow chart showing the state of directions processing of a communication channel such as directions for fixed network communication by a management server in the present embodiment.

FIG. 8 is a flow chart showing processing of a communication channel directions, such as directions for fixed network, performed by the management server. Although not shown schematically, the management server 253 comprises a CPU, a storage medium storing a predetermined control program, a communication unit for performing communication with the fixed network 248 and the mobile network 252, etc., and has the same constitution as that of a personal computer.

The management server 253 waits for the reception of the headset position information intermittently sent out from the headset 201 shown in FIG. 1 and the portable phone position information similarly intermittently sent out from the portable phone 254 (steps S361, S362), in addition thereto, the management server 253 monitors whether the specified time for processing of communication channel directions have come (step S363).

Then, when receiving the headset position information (step S361: Y), the management server stores the headset position information along with the reception time in a reception buffer region prepared for the telephone number of the portable phone 254 corresponding to the identification number of the headset (step S364). Here, the reception buffer region prepared for each telephone number is a memory region prepared for writing a plurality of pieces of data from the data relating to the most recent time, and the most recent data overwrites the oldest data.

When the portable phone position information is received (step S362: Y), the management server stores the portable telephone position information along with the reception time in a reception buffer region prepared for the telephone number of the corresponding portable phone 254 (step S365). In this way, in the reception buffer region prepared for each telephone number, the most recent to the fourth or fifth most recent pieces of the headset position information and the portable phone position information are always stored in this order.

In parallel to this processing, each time the specified time for directions of communication channel arrives at predetermined time intervals (step S363: Y), the management server 253 acquires the position information between the current time and the time t3 corresponding to the telephone number from the corresponding reception buffer region (step S366). Here, the time t3 is, for example, the sum of the time t1 and the time t2, however, the time t3 may be set to another value.

After the management server acquires the contents in the corresponding reception buffer in this way, the CPU of the management server checks whether both of the headset position information and the portable phone position information are included therein (step S367). If both are included (Y), it means that the headset position information is sent to the management server 253 from the headset 201 at a time comparatively near to that time. This means that communication by the headset 201 using the channel 258 (FIG. 3) is possible. As a result, the management server 253 transmits the communication directions using the fixed network 248 to the headset 201 through the channel 258 from the standpoint of economy (step S368).

In contrast, if the position information within the time t3 in the reception buffer region is composed of only the portable phone position information (step S367: N, S369: Y), the CPU judges that communication by the headset 201 through the channel 258 (FIG. 3) cannot be established, then transmits the communication directions by the mobile network 252 using the channel 259 (FIG. 3) to the headset 201 via the portable phone 254 (step S370). The headset 201 receives and overwrites the communication directions by the fixed network 248 or the communication directions by the mobile network 252, thereby prepares for the judgment in step S346 in FIG. 7.

In addition, the N-branch in step S369 in FIG. 8 shows the case where the portable phone cannot communicate with the node 249 for some reasons (for example, fading etc.) of the portable phone.

Returning to FIG. 7, we continue explanation. In step S346, if no connection directions to the fixed network 248 is issued (N), the headset performs call origination to the other party using the mobile network 252 (step S348).

On the other hand, if the user presses the call/call end button 208 (step S342: Y), the CPU of the headset judges whether the current state is a voice communication state (step S349) If it is in a communication state (Y), the CPU of the headset disconnects the call (step S350). In contrast, if an incoming call arrives, not in a voice communication state (step S349: N), the call is connected (step S351). Then, the telephone number of the other party is overwritten in the telephone number storage region 224A (step S352). The telephone number that has overwritten is used for the next call origination (step S341: Y, S343).

Referring to FIG. 9 to FIG. 12, we will explain the operation of the present embodiment in individual different communication environments.

Figure 9:
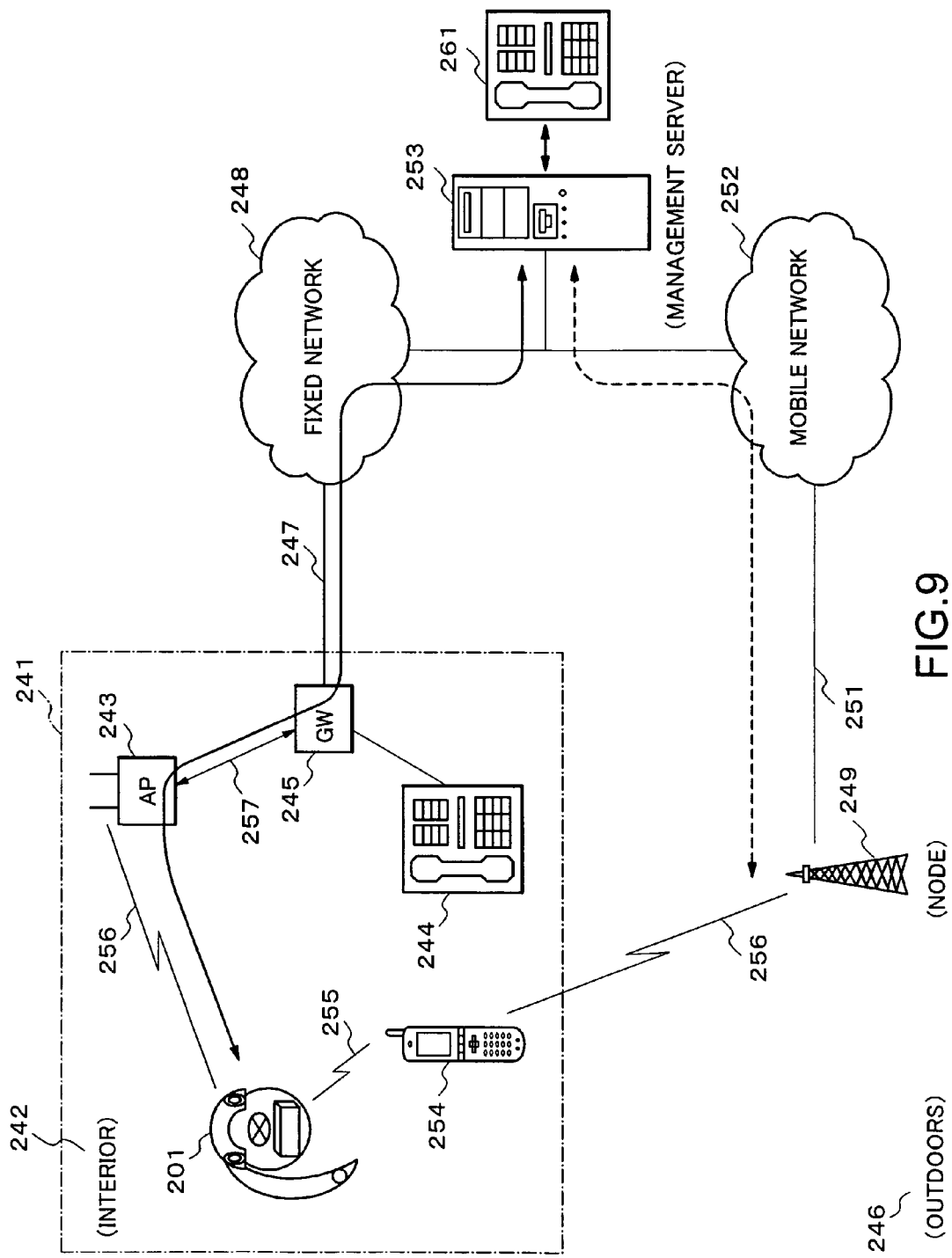
FIG. 9 is a diagram showing an example of a communication environment in the present embodiment, wherein the headset is capable of communicating with both the AP and the portable phone.

First, in the communication environment shown in FIG. 9, the management server has judged that the headset 201 is in an area in which communication with the access point 243 and the portable phone 253 is possible. Further, the management server 253 has judged that the portable phone 254 also is in the communication area of the mobile network 252. Accordingly, when transmitting or receiving, it is possible to make a call to, for example, another fixed telephone 261 using the headset 201 via the fixed network 248 and at the same time, it is possible to make a call by the portable phone 254 using the mobile network 252. Further, when using the portable phone 254, it is also possible to make a call by the headset 201 using Bluetooth. In such a situation, the management server 253 directs a call via the fixed network 248 to the headset in order to utilize the resource of the fixed network 248 as well as reducing the load of the communication fee of the user (FIG. 8, step S368). When making a call using the headset 201, the headset uses the telephone number of the portable phone 254. For this reason, when making a call using the headset 201, the user cannot use the portable phone 254.

Figure 10:
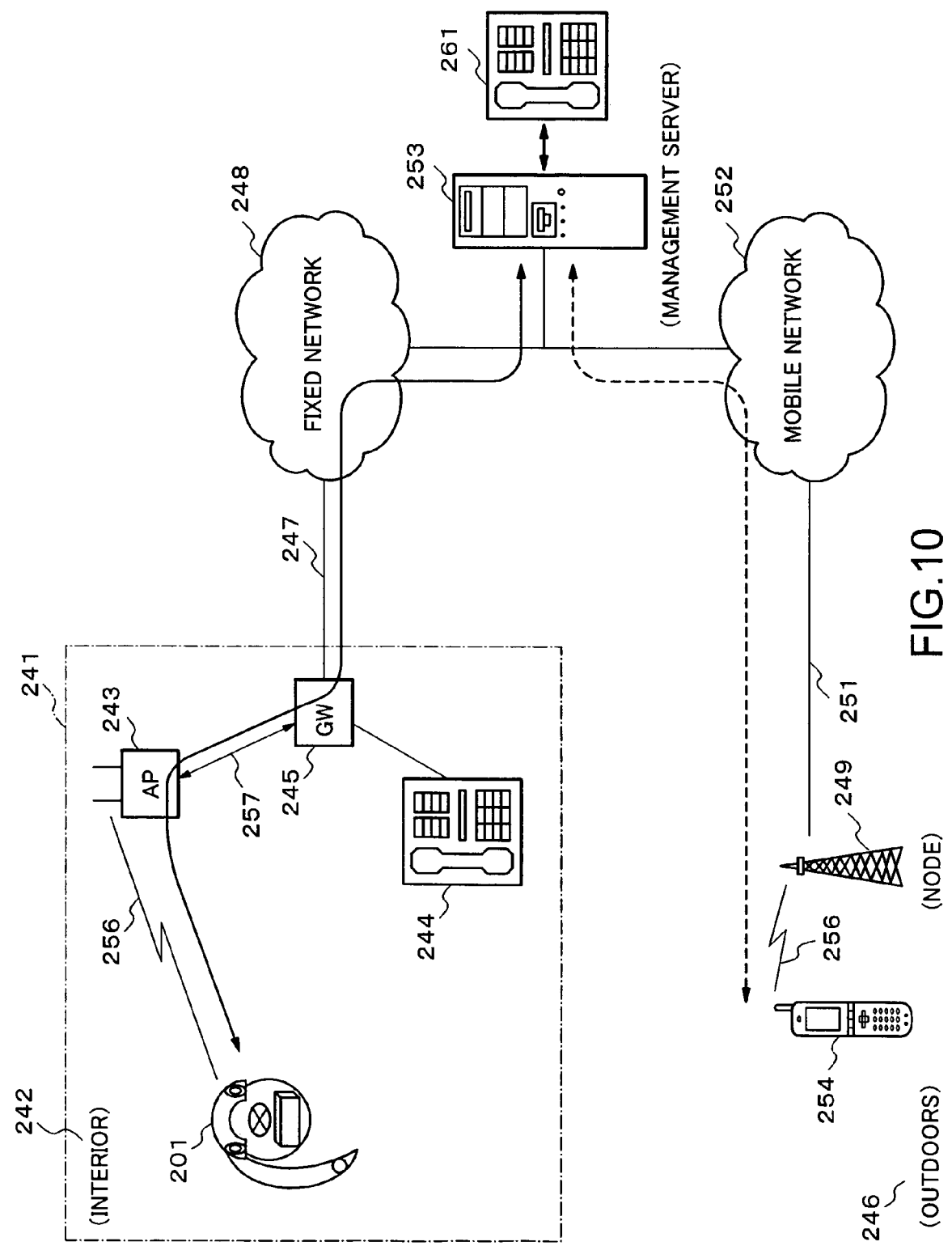
FIG. 10 is a diagram showing another example of a communication environment in the present embodiment, wherein the headset is capable of communicating with the AP but not with the portable phone.

Next, we will explain the communication in the communication environment shown in FIG. 10. In this communication environment, although the headset 201 is in a communication area with the access point 243, the portable phone 254 is in the outdoors 246. Accordingly, it is not possible for the portable phone to communicate with the handset by using the Bluetooth. From the above-mentioned judgment result, it is possible for the user to make a call by the headset 201 using the fixed network 248 when transmitting and receiving. In such a situation, the management server 253, as a result, directs a call using the headset via the fixed network 248 from the standpoint that it is possible to reduce the communication fee of the user and to utilize the resource of the fixed network 248 (FIG. 8, step S368).

In addition, in the communication environment shown in FIG. 10, since the portable phone 254 is in the communication area of the mobile network 252, the user also can make a call by the portable phone 254 using the mobile network 252. However, when using the portable phone 254, the user cannot use the headset 201.

Figure 11:
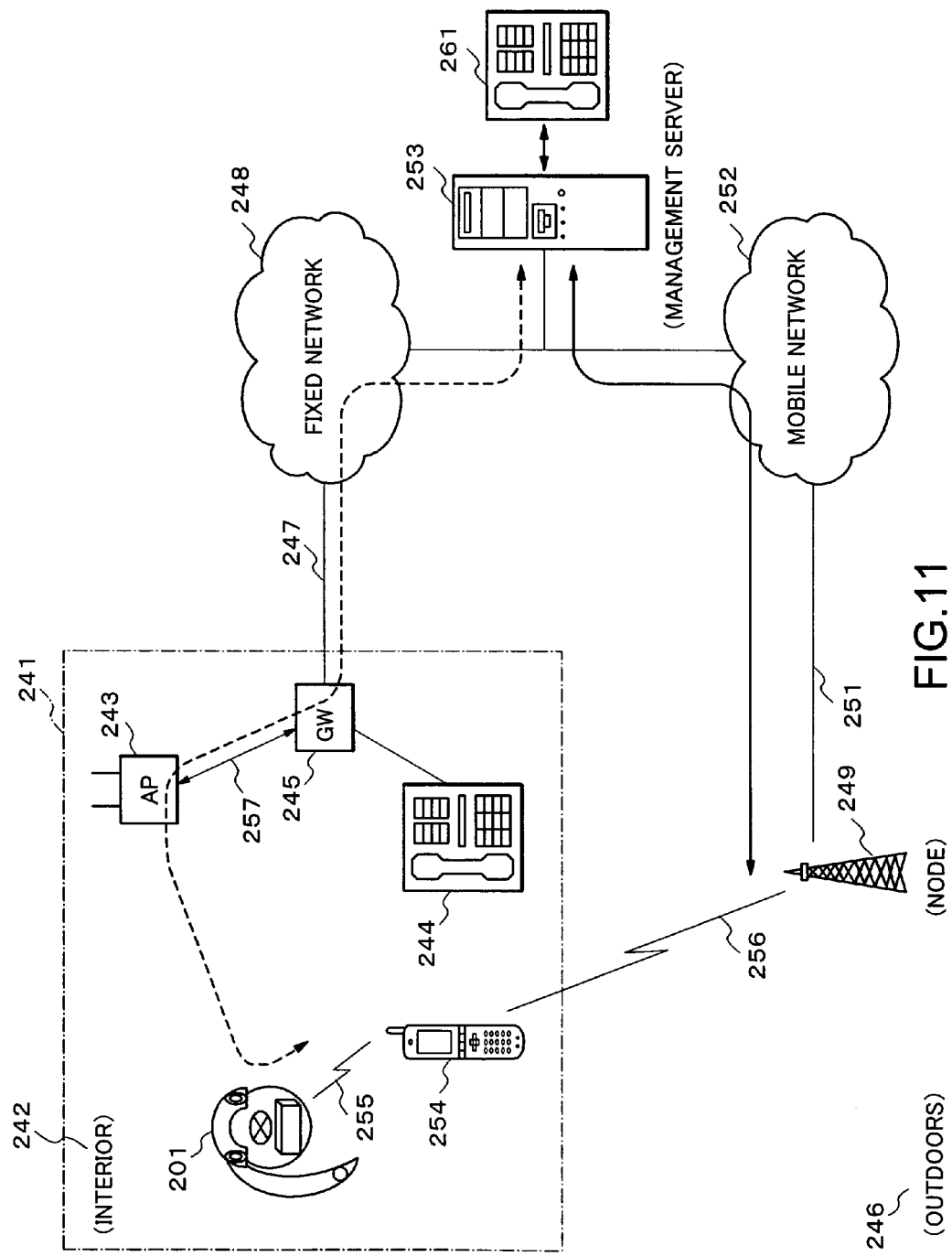
FIG. 11 is a diagram showing still another example of a communication environment in the present embodiment, wherein the headset is not capable of communicating with the AP but capable of communicating with the portable phone.

Next, we will explain the communication environment shown in FIG. 11. In the communication environment of the interior 242, the headset 201 can perform communication using the portable phone 254 and Bluetooth. However, the headset is outside the communication area with the access point 243. The portable phone 254 is in the communication area of the mobile network 252. From the above-mentioned judgment result, the management server 253 issues directions for a call via the mobile network 252 using the portable phone 254 (FIG. 8, step S370). Of course, when using the portable phone 254, the user can use the headset 201 as an alternative.

Figure 12:
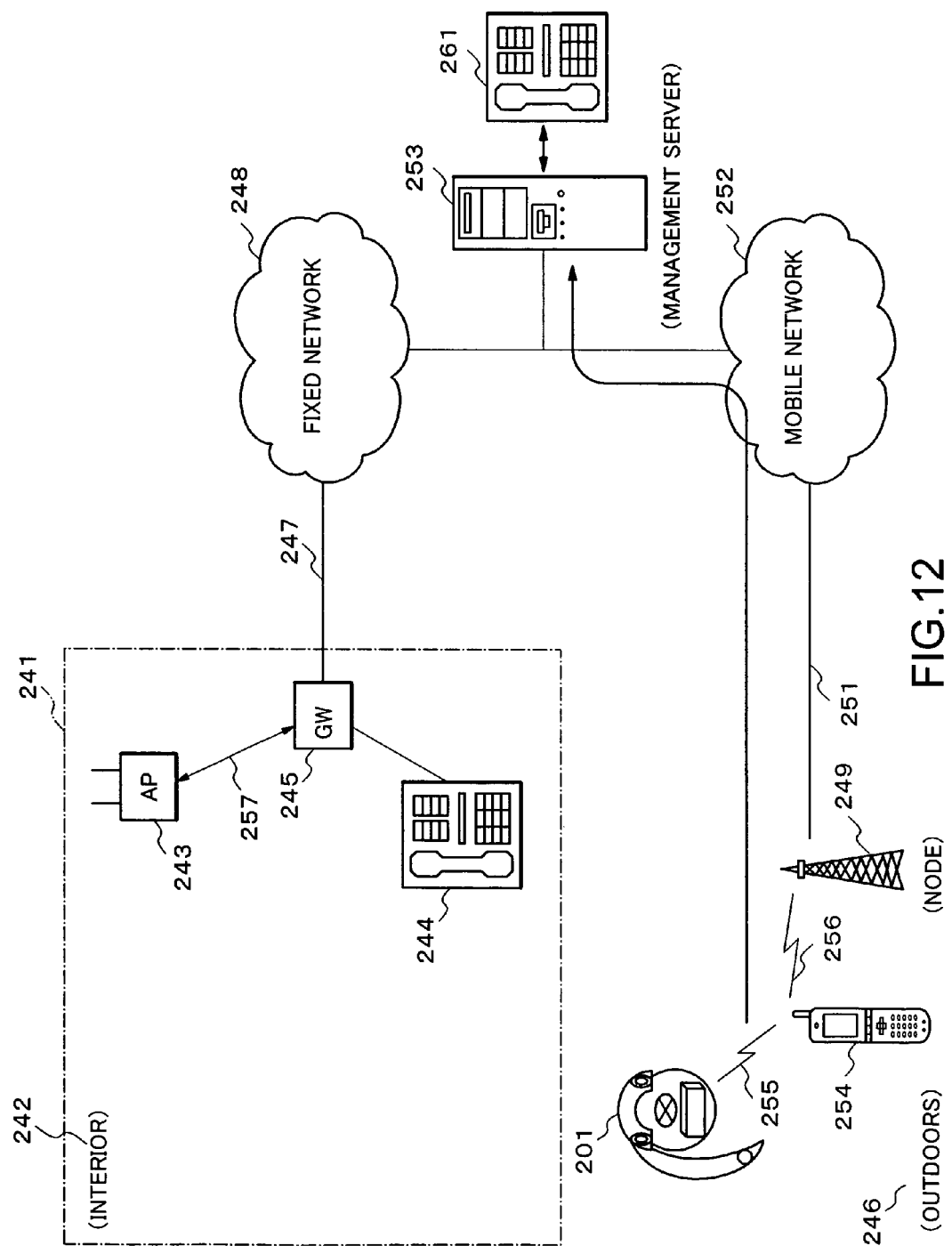
FIG. 12 is a diagram showing still another example of a communication environment in the present embodiment, wherein the headset is not capable of communicating with the AP but capable of communicating with the portable phone.
Figure 13:
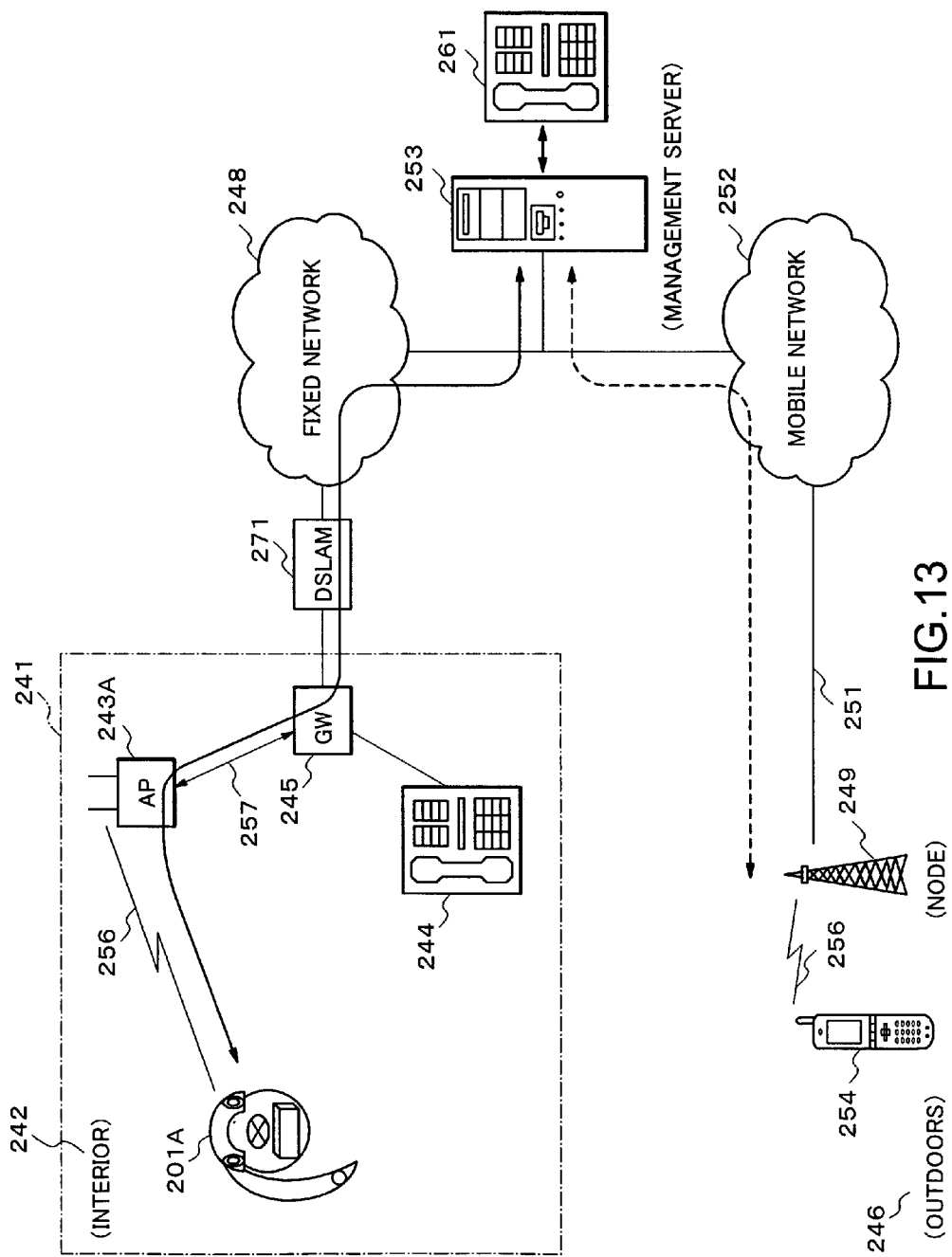
FIG. 13 is a system configuration diagram showing the configuration of a portable communication system in a modification example of the present invention.
Figure 14:
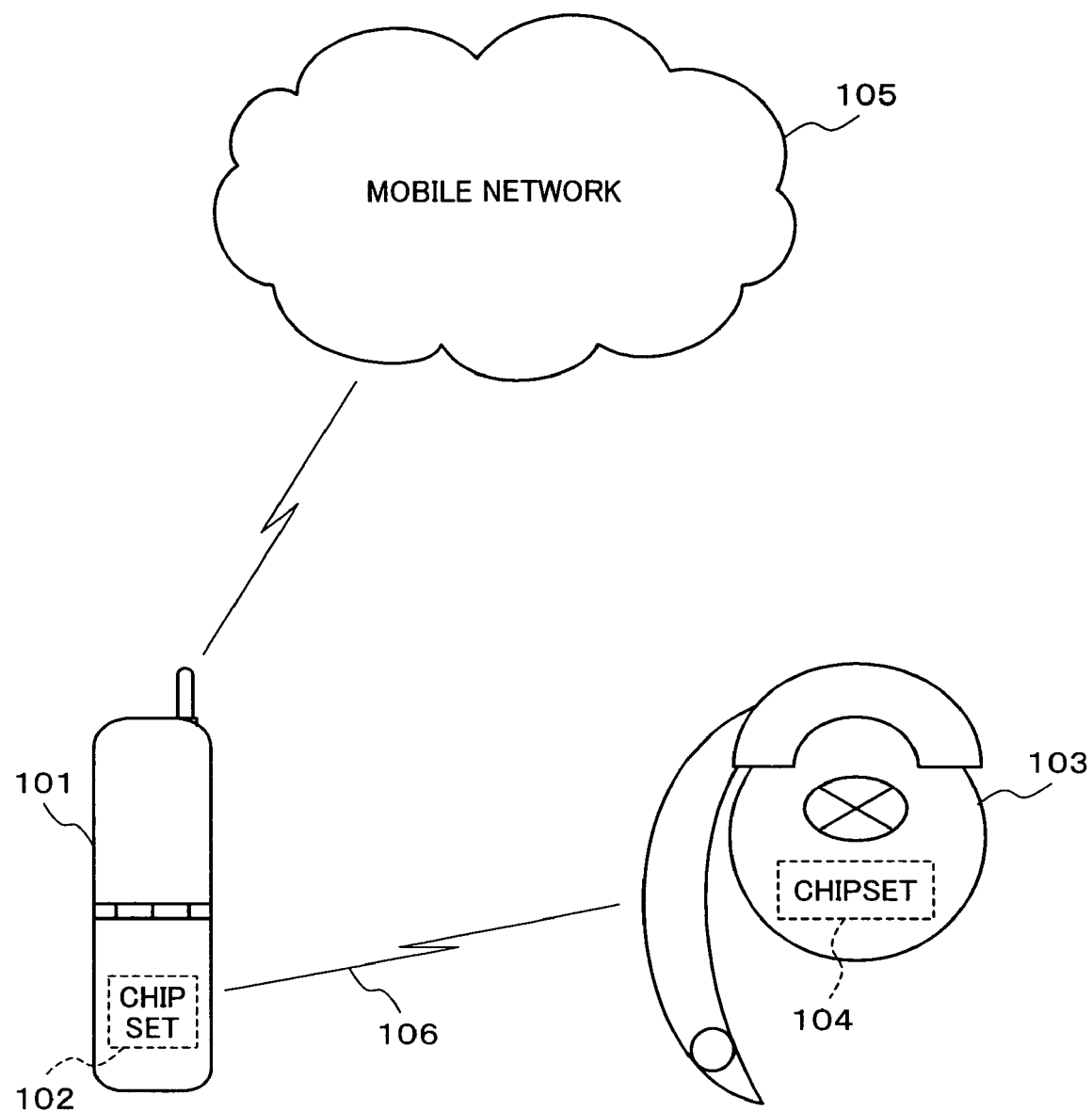
FIG. 14 is a system configuration diagram showing a case where a portable communication terminal is operated as an audio gateway.

Next, we will explain the communication in the communication environment shown in FIG. 12. In this communication environment, the headset 201 exists in the outdoors 246 and is outside the communication area with the access point 243. The portable phone 254 also exists in the outdoors 246 and it is possible to communicate with the headset 201 using Bluetooth. In FIG. 13 also, the portable phone can communicate with the mobile network via the node 249. In this situation, at the time of call origination and reception, it is possible for the user to make a call to, for example, the fixed telephone 261 via the mobile network 252 using the portable phone 254. Of course, when using the portable phone 254, the user can use the headset 201 as an alternative.

FIG. 13 shows a portable communication system constitution in a modification example of the present invention. In FIG. 13, the same parts as those in FIG. 10 have the same symbols and we will omit explanation of these parts at our own discretion.

In this modification example, a headset 201A utilizes radio communication by a wireless LAN (Local Area Network), while the headset 201 in the previous embodiment uses Bluetooth. Accordingly, the access point 243A corresponds to the wireless LAN. Similarly, a portable phone 254A corresponds to the wireless LAN.

Further, a Digital Subscriber Line Access Multiplexer (DSLAM) 271 is disposed between the access gateway 245 and the fixed network 248. In this way, the fixed network 248 is not limited to a normal line exchange system but may be an xDSL (x Digital Subscriber Line) system. In the case of the xDSL system, it is necessary to bundle together a plurality of xDSL lines as shown in FIG. 13, connect it to a communication device such as router, not shown, and provide the DSLAM 271 as a concentrator for bridging to a high-speed, large-capacity backbone.

In addition, in the above-mentioned embodiments, the management server 253 performs the control to make a call using either the fixed network 248 or the mobile network 252, however, it may also be possible to perform control to make a call using the fixed network 248, provided that the conditions of judgment are that the headset 201 can perform radio communication with the access point 243. That is, it will be sufficient for the headset to interpret the reception of the response signal to the identification number which the access point has transmitted in step S332 in FIG. 6 as directions to use the fixed network and make judgment in step S346 in FIG. 7. In this case, the management server 253 is not necessary.

In addition, in the above-mentioned embodiments, the case where the headset 201 has a normal microphone is explained as an example, however, in the present invention, instead of a normal microphone, an osteoconductive microphone may be used. Further, the headset 201 includes various structures and it is apparent that each of these can be applied in the present invention. A headphone type that is mounted on both ears can be used in the present invention.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included with the sprit and scope of the following claims. Further, the inventor's intent is to retain all equivalents even if the claims are amended during prosecution.

What is claimed is:

1. A headset comprising:
    a radio communication unit having a first radio communication mode for performing radio communication with an access point connected to a fixed network and a second radio communication mode for performing radio communication with a specific portable communication-terminal, wherein a communication via the first radio communication mode and a communication via the second radio communication mode are based on a telephone number of said specific portable communication terminal; and
    a communication control unit judging whether the headset is able to communicate with said access point or with said specific portable communication terminal, selecting either one of said first communication mode and said second communication mode based on the judgment result, and connecting the telephone number of said specific portable communication terminal to the fixed network via said access point with said telephone number as a telephone number of a call originating party to perform communication using the selected radio communication mode, when the headset is able to communicate with said access point according to the judgment result.

2. The headset according to claim 1, wherein said communication control unit further comprises a telephone number storage unit for storing the telephone number of the other party with which communication is performed immediately before, a calling unit for making a call to a telephone number stored in the telephone number storage unit, a call starting unit for starting a call when there is an incoming call, and a call ending unit for ending a call with the other party.

3. The headset according to claim 1, wherein said communication control unit operates said radio communication unit in said first communication mode based on first connection directions information supplied via said access point.

4. The headset according to claim 3, wherein said communication control unit operates said radio communication unit in said second communication mode when said first selection directions information does not exist.

5. The headset according to claim 3, wherein said first communication mode and said second communication mode are performed by a BLUETOOTH protocol communication.

6. The headset according to claim 3, wherein said first communication mode is performed based on a radio LAN system.

7. A portable communication system comprising:
a fixed network;
an access point connected to the fixed network;
a mobile network;
a portable communication terminal configured and operative to be connected to the mobile network;
a headset capable of transmitting with the same telephone number as that of said portable communication terminal, said headset having
a radio communication unit having a first radio communication mode for performing radio communication with said access point and a second radio communication mode for performing radio communication with said portable communication terminal, wherein a communication via the first radio communication mode and a communication via the second radio communication mode are based on a telephone number of said specific portable communication terminal; and
a communication control unit for making said radio communication unit perform communication with said fixed network via said access point using said first radio communication mode;
said system further having
a radio communication capability judging unit for judging whether or not said headset is capable of performing radio communication with said access point or with said portable communication terminal; and
a network selection unit configured and operative to direct said headset to make a call to another party using said fixed network via said access point when the radio communication capability judging unit judges that radio communication with said access point is possible, otherwise, directing said headset to make a call to another party using said mobile network.

8. The portable communication system according to claim 7, wherein said network selection unit is connected to said fixed network and said mobile network, and is a management server selecting which of said fixed network and said mobile network to be used to make a call based on presence/absence of reception of individual identification information that said headset and portable communication terminal transmit.

9. The portable communication system according to claim 7, wherein said first communication mode and said second communication mode are performed according to a BLUETOOTH protocol.

10. The portable communication system according to claim 7, wherein said first communication mode and said second communication mode are performed by a radio LAN.

* * * * *